(12) United States Patent
Rhee

(10) Patent No.: US 12,131,045 B2
(45) Date of Patent: Oct. 29, 2024

(54) MEMORY SYSTEM AND OPERATING METHOD THEREOF

(71) Applicant: SK hynix Inc., Gyeonggi-do (KR)

(72) Inventor: Myung Hyun Rhee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 679 days.

(21) Appl. No.: 17/358,975

(22) Filed: Jun. 25, 2021

(65) Prior Publication Data

US 2022/0197530 A1    Jun. 23, 2022

(30) Foreign Application Priority Data

Dec. 18, 2020    (KR) .................... 10-2020-0178442

(51) Int. Cl.
```
G06F 3/06      (2006.01)
G06F 18/21     (2023.01)
G06F 18/214    (2023.01)
G06N 3/04      (2023.01)
G06N 3/08      (2023.01)
```
(52) U.S. Cl.
CPC .......... G06F 3/0644 (2013.01); G06F 3/0604 (2013.01); G06F 3/0659 (2013.01); G06F 3/0679 (2013.01); G06F 18/214 (2023.01); G06F 18/2163 (2023.01); G06N 3/04 (2013.01); G06N 3/08 (2013.01)

(58) Field of Classification Search
CPC .. G06F 3/0644; G06F 18/2163; G06F 18/214; G06F 3/0604; G06F 3/0659; G06F 3/0679; G06N 3/04; G06N 3/08
See application file for complete search history.

(56) References Cited

U.S. PATENT DOCUMENTS

| | | | |
|---|---|---|---|
| 2019/0050648 A1* | 2/2019 | Stojanovic | G06V 20/13 |
| 2021/0224191 A1* | 7/2021 | Wang | G06F 12/1072 |
| 2022/0044112 A1* | 2/2022 | Zheng | G06N 3/04 |
| 2022/0044119 A1* | 2/2022 | Wang | G06N 20/00 |

FOREIGN PATENT DOCUMENTS

| | | |
|---|---|---|
| KR | 10-2020-0018188 A | 2/2020 |
| KR | 10-2020-0021878 A | 3/2020 |

\* cited by examiner

*Primary Examiner* — Baboucarr Faal
(74) *Attorney, Agent, or Firm* — IP & T GROUP LLP

(57) ABSTRACT

A memory system and an operating method thereof are provided. The memory system includes a plurality of memory devices configured to store pieces of partial data obtained by partitioning an embedding table including pieces of vector information about items of a learning model that have already been acquired, and a memory controller configured to obtain, in response to a query received from a host, pieces of data corresponding to the query among the pieces of partial data from each of the plurality of memory devices, perform a pooling operation for generating embedding data using the pieces of data that have been obtained, and provide the embedding data to the host.

23 Claims, 12 Drawing Sheets

MEMORY SYSTEM AND OPERATING METHOD THEREOF

CROSS-REFERENCE TO RELATED APPLICATION

The present application claims priority under 35 U.S.C. § 119(a) to Korean patent application number 10-2020-0178442, filed on Dec. 18, 2020 with the Korean Intellectual Property Office, and which is incorporated herein by reference in its entirety.

BACKGROUND

Field of Invention

Various embodiments of the present disclosure generally relate to an electronic device, and more particularly, to a memory system and an operating method thereof.

Description of Related Art

A memory system typically stores data in response to control of a host device such as a computer or a smartphone. A memory system includes a memory device storing data and a memory controller controlling the memory device. Memory devices are generally classified as either volatile memory devices or non-volatile memory devices.

Volatile memory devices store data only when power is supplied thereto and lose stored data in the absence of a power supply. Examples of volatile memory devices include Static Random Access Memory (SRAM) and Dynamic Random Access Memory (DRAM).

Non-volatile memory devices retain stored data even in the absence of a power supply. Examples of non-volatile memory devices include Read Only Memory (ROM), Programmable ROM (PROM), Electrically Programmable ROM (EPROM), Electrically Erasable and Programmable ROM (EEPROM), and flash memory.

SUMMARY

Various embodiments of the present disclosure are directed to a plurality of improved sub-memory systems performing Near Data Processing (NDP) and a pooled memory system including the same.

According to an embodiment of the present disclosure, a memory system may include a plurality of memory devices configured to store pieces of partial data obtained by partitioning an embedding table including pieces of vector information about items of a learning model that has already been acquired, and a memory controller configured to obtain, in response to a query received from a host, pieces of data corresponding to the query among the pieces of partial data from each of the plurality of memory devices, perform a pooling operation for generating embedding data using the pieces of data that have been obtained, and provide the embedding data to the host, wherein the query includes a request for the pooling operation, an address of host memory to receive the embedding data, and a physical address corresponding to any one among the plurality of memory devices.

According to an embodiment of the present disclosure, a memory system may include a plurality of memory devices configured to store pieces of partial data obtained by partitioning an embedding table including pieces of vector information about items of a learning model that has already been acquired, and a memory controller configured to perform, in response to a query received from a host and embedding data, an unpooling operation for generating pieces of partition data using the embedding data and control the plurality of memory devices to update partial data corresponding to the pieces of partition data stored in each of the plurality of memory devices.

According to an embodiment of the present disclosure, a pooled memory system may include a host device, and a plurality of sub-memory systems configured to store pieces of partial data obtained by partitioning an embedding table including pieces of vector information about items of a learning model that has already been acquired, wherein the host device is configured to broadcast a first query to the plurality of sub-memory systems and control each of the plurality of sub-memory systems to obtain pieces of data corresponding to the first query among the pieces of partial data by using the first query, perform a pooling operation for generating embedding data using the pieces of data that have been obtained, and provide the embedding data to the host device.

According to an embodiment of the present disclosure, a pooled memory system may include a plurality of sub-memory systems, each of the plurality of sub-memory systems including a memory device configured to store pieces of partial data obtained by partitioning an embedding table including pieces of vector information about items of a learning model that has already been acquired and a memory controller configured to perform a pooling operation for generating pieces of embedding data and an unpooling operation for partitioning training data and a host device configured to generate the training data using the pieces of embedding data received from the plurality of sub-memory systems and control the plurality of sub-memory systems to learn the training data.

DETAILED DESCRIPTION

Figure 1:
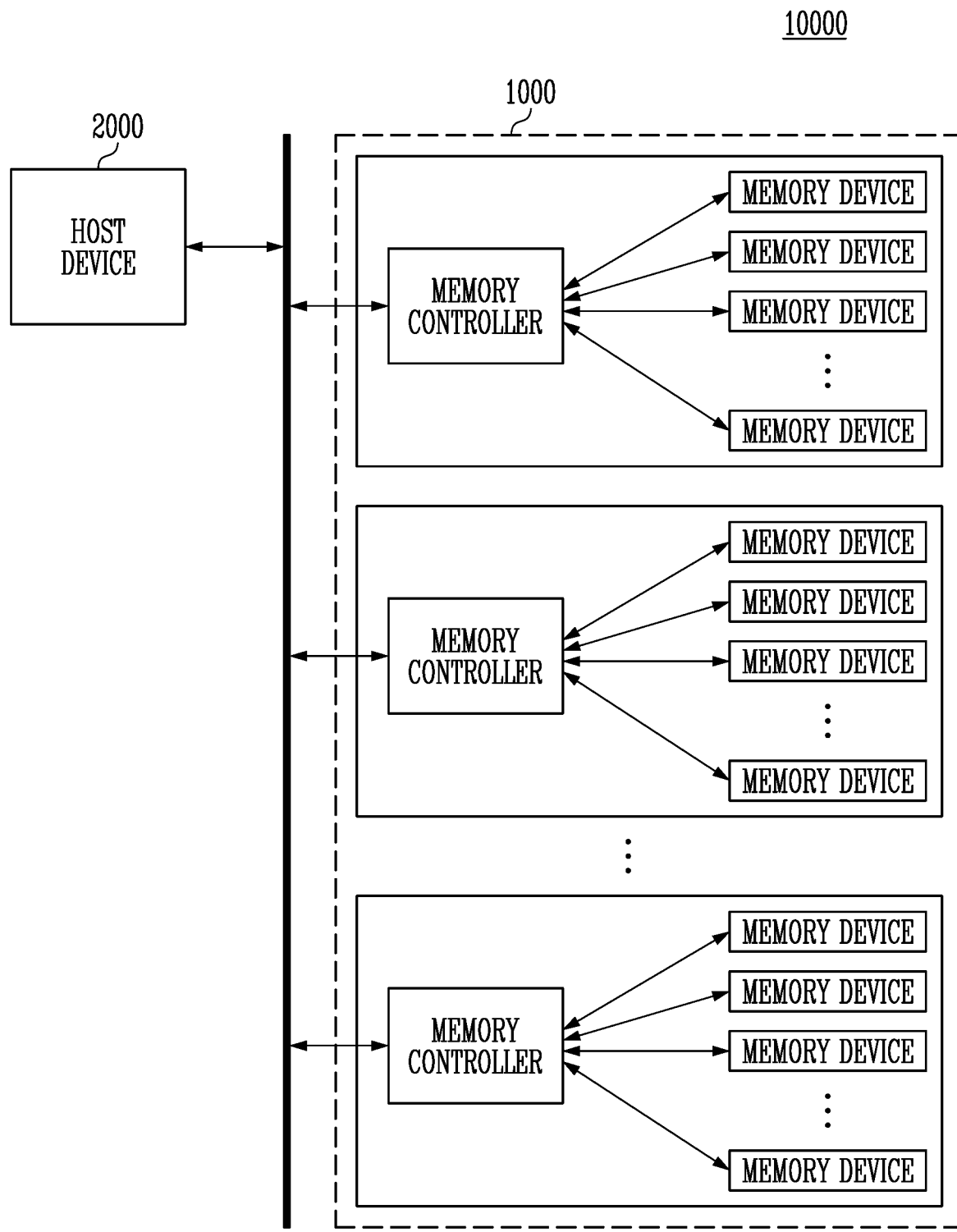
FIG. 1 is a block diagram illustrating a pooled memory system according to an embodiment of the present disclosure.

Specific structural or functional descriptions of embodiments in accordance with concepts which are disclosed in this specification are illustrated only to describe the embodiments in accordance with the concepts. The embodiments in accordance with the concepts may be carried out through various forms but the descriptions are not limited to the embodiments described in this specification.

Various modifications and changes may be applied to the embodiments in accordance with the concepts so that the embodiments will be illustrated in the drawings and described in the specification. However, the embodiments according to the concepts of the present disclosure are not construed as limited to specified disclosures, and include all changes, equivalents, or substitutes that do not depart from the spirit and technical scope of the present disclosure. In some embodiments, well-known processes, device structures, and technologies will not be described in detail to avoid ambiguousness of the present disclosure. The intent is to disclose the gist of the present disclosure more clearly by omitting unnecessary description.

Hereinafter, various embodiments of the present disclosure will be described with reference to the accompanying drawings to describe the present disclosure in detail.

FIG. 1 is a block diagram illustrating a pooled memory system 10000 according to an embodiment of the present disclosure.

Referring to FIG. 1, the pooled memory system 10000 may include a plurality of sub-memory systems 1000 and a host device 2000.

The pooled memory system 10000 may be a device providing a recommendation system service. The recommendation system service may refer to a service providing a user with personalized information by filtering information. The pooled memory system 10000 may obtain a user information profile by inquiring personal information, interests, preference, etc., of the user and may recommend or provide information and items that suit user's preference information based on the obtained user information profile.

The recommendation system service may be implemented as a deep learning-based algorithm for training and inference with high performance to effectively use or provide a huge and increasing volume of service data. However, because the deep learning-based recommendation system performs an embedding operation or the like, mainly based on a host device, bandwidth issues may be caused and a memory capacity may be insufficient due to demand for a huge volume of service data.

According to an embodiment of the present disclosure, the pooled memory system 10000 may provide a recommendation system service with a sufficient memory capacity and without bandwidth issues, that is, the pooled memory system 10000 may secure the sufficient memory capacity by a pooled memory structure capable of adding a memory capacity and may be implemented to perform Near Data Processing (NDP) to solve the bandwidth issues. More specifically, the pooled memory system 10000 may be implemented as a pooled memory structure including the plurality of sub-memory systems 1000 in which a plurality of memory devices are coupled in parallel with each other. In addition, the pooled memory system 10000 may control the plurality of sub-memory systems 1000 to perform simple operations related to the embedding operation.

The pooled memory system 10000 may be implemented as a form in which the plurality of sub-memory systems 1000 and the host device 2000 included therein are interconnected. The plurality of sub-memory systems 1000 may perform an inference operation and a training operation in response to control of the host device 2000. The inference operation may be related to a read operation of a memory system and the training operation may be related to a write operation of the memory system. The inference operation and the training operation will be described later in more detail.

To perform the inference operation and the training operation, the plurality of sub-memory systems 1000 may store data about a learning model that has already been acquired. In the present disclosure, the plurality of sub-memory systems 1000 already acquire and store therein embedding table or the data about a learning model. Through the inference operation, the plurality of sub-memory systems 1000 may provide at least a part of the stored embedding table to the host device 2000. Through the training operation, the plurality of sub-memory systems 1000 may update at least a part of the stored embedding table based on the training data provided from the host device 2000. The host device 2000 may receive the at least part of the embedding table from the plurality of sub-memory systems 1000 through the inference operation. The host device 2000 may update the received part to generate the training data. The host device 2000 may provide the training data to the plurality of sub-memory systems 1000 to update the embedding table stored in the plurality of sub-memory systems 1000 through the training operation.

More specifically, the plurality of sub-memory systems 1000 may store vector information about items of the learning model that have already been acquired. The learning model may refer to an artificial intelligence (AI) model, and the AI model may be built by training. The meaning of building by training may refer to building a predefined operating rule or AI model set to perform a desired feature by training a basic AI model using a plurality of pieces of training data by a learning algorithm. The above-described training may be performed in the pooled memory system 10000 according to the present disclosure or in an external server and/or system. Examples of a learning algorithm include a supervised learning algorithm, an unsupervised learning algorithm, a semi-supervised learning algorithm, or a reinforcement learning algorithm, in particular, the learning algorithm may refer to the supervised learning algorithm.

The learning model may include a plurality of network nodes mimicking neurons of human neural networks and having weights. The plurality of network nodes may form respective connection relationships to mimic a synaptic activity of a neuron for exchanging signals through synapses. For example, the AI model may include a neural network model or a deep learning model developed from the neural network model. In the deep learning model, the plurality of network nodes may be located in different depths (or layers) and exchange data according to a convolutional connection relationship. For example, a model such as a deep neural network (DNN) model, a recurrent neural network (RNN) model, or a bidirectional recurrent deep neural network (BRDNN) model may be used as a data recognition model. However, examples of the data recognition model are not limited thereto.

According to an embodiment of the present disclosure, functions related to the recommendation system service of the pooled memory system 10000 may be performed according to control of the host device 2000. More specifically, the host device 2000 may include a host processor and host memory. The host processor may be a universal processor such as a central processing unit (CPU), an application processor (AP), or a digital signal processor (DSP), a graphic dedicated processor such as a graphics processing unit (GPU) or a vision processing unit (VPU), or an AI dedicated processor such as a neural processing unit (NPU). The host memory may store an operating system or an application program for providing the recommendation system service.

The host device 2000 may broadcast a query to the plurality of sub-memory systems 1000. By using the query, the host device 2000 may control the plurality of sub-memory systems 1000 to obtain pieces of data corresponding to the query among pieces of partial data from each of the plurality of sub-memory systems 1000. The host device 2000 may control the plurality of sub-memory systems 1000 to perform a pooling operation for generating embedding data using the pieces of obtained data and to provide the embedding data to the host device 2000. The query may include a request for the pooling operation, an address of host memory to receive the embedding data, and a physical address corresponding to any one among a plurality of memory devices.

The host device 2000 may generate training data for updating an embedding table based on data received from each of the plurality of sub-memory systems. As will be described later, the training data may also be expressed as embedding data that is broadcasted from the host device 2000 to each of the sub-memory systems and is utilized by each of the sub-memory systems to update partial data stored therein, the partial data being a part of the embedding table. In addition, the host device 2000 may broadcast the training data together with the query. By using the query broadcasted together with the training data, the host device 2000 may control the plurality of sub-memory systems 1000 to perform an unpooling operation for generating pieces of partition data by partitioning the training data and to update partial data corresponding to the pieces of partition data in each of the sub-memory systems. The query may include a request for the unpooling operation, an address of host memory corresponding to the embedding data, and a physical address corresponding to any one among a plurality of memory devices.

Figure 2:
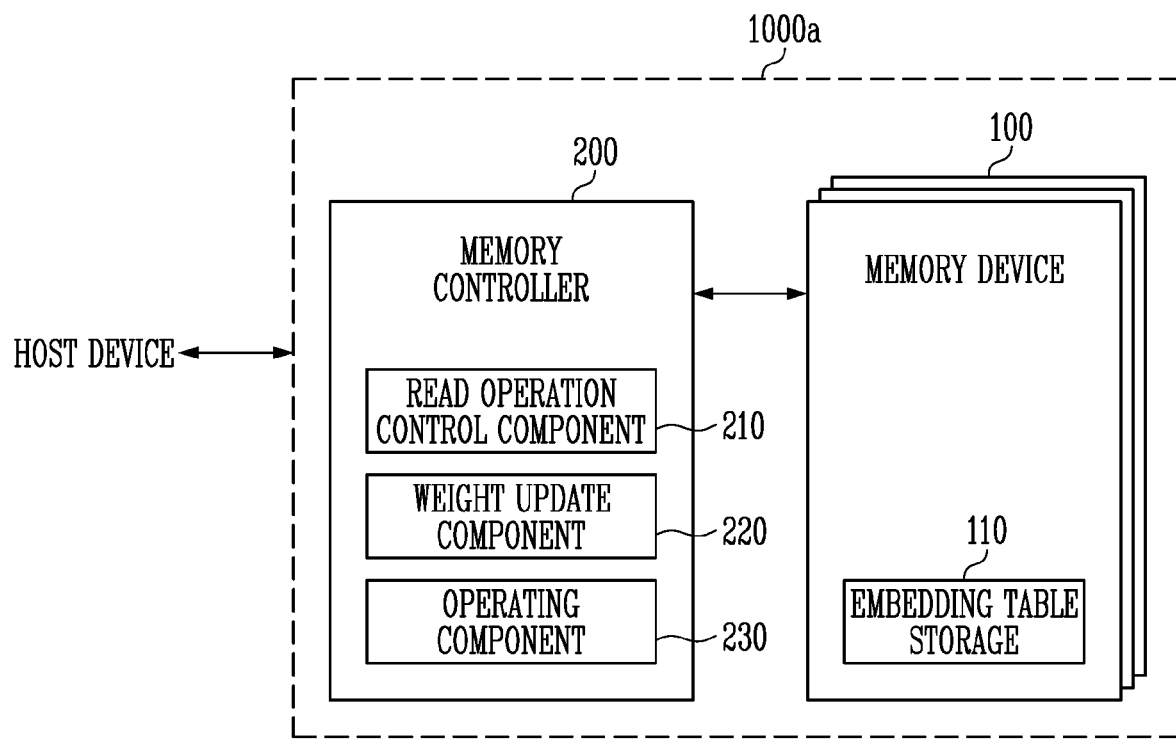
FIG. 2 is a block diagram illustrating a sub-memory system according to an embodiment of the present disclosure.

FIG. 2 is a block diagram illustrating a sub-memory system according to an embodiment of the present disclosure.

Referring to FIG. 2, one sub-memory system 1000*a* of the plurality of sub-memory systems 1000 is illustrated.

The sub-memory system 1000*a* may be implemented as one of various types of memory systems according to a host interface corresponding to a communication method with the host device 2000. For example, the sub-memory system 1000*a* may be implemented as one of various types of storage devices such as a solid state drive (SSD), a multimedia card in the form of a multimedia card (MMC), an eMMC, an RS-MMC, and a micro-MMC, a secure digital card in the form of a secure digital (SD) card, a mini-SD card, and a micro-SD card, a universal serial bus (USB) memory system, a universal flash storage (UFS) device, a personal computer memory card international association (PCMCIA) card type memory system, a peripheral component interconnection (PCI) card type memory system, a PCI Express (PCI-E) card type memory device, a compact flash (CF) card, a smart media card, and a memory stick.

The sub-memory system 1000*a* may be implemented as one of various kinds of package types. For example, the sub-memory system 1000*a* may be implemented as one of various kinds of package types such as a package on package (POP), a system in package (SIP), a system on chip (SOC), a multi-chip package (MCP), a chip on board (COB), a wafer-level fabricated package (WFP), and a wafer-level stack package (WSP).

The sub-memory system 1000*a* may include a memory device 100 and a memory controller 200.

The memory device 100 may store data or use stored data. More specifically, the memory device 100 may operate in response to control of the memory controller 200. The memory device 100 may include a plurality of banks storing data. Each of the plurality of banks may include a memory cell array including a plurality of memory cells.

The memory device 100 may be volatile random access memory such as Dynamic Random Access Memory (DRAM), SDRAM, DDR SDRAM, DDR2 SDRAM, DDR3 SDRAM, LPDDR SDRAM, LPDDR2 SDRAM, and LPDDR3 SDRAM. By way of example, the memory device 100 is DRAM in the context of the following description.

The memory device 100 may receive a command and an address from the memory controller 200. The memory device 100 may be configured to access an area selected by the received address in the memory cell array. Accessing the selected area may refer to performing an operation corresponding to the received command on the selected area. For example, the memory device 100 may perform a write operation (or a program operation), a read operation, and an erase operation. The write operation may be an operation in which the memory device 100 writes data to the area selected by the address. The read operation may refer to an operation in which the memory device 100 reads data from the area selected by the address. The erase operation may refer to an operation in which the memory device 100 erases data from the area selected by the address.

According to an embodiment of the present disclosure, the memory device 100 may include embedding table storage 110 storing an embedding table. The embedding table may be a table including vector information about items of a learning model that have already been acquired. More specifically, the memory device 100 may store pieces of partial data which result from partitioning the embedding table. The pieces of partial data may be data obtained by partitioning the embedding table by units of dimensions of the vector information, and the memory device 100 may store partial data corresponding to at least one dimension. To avoid repetitive descriptions, descriptions regarding the embedding table and the partial data are described below with reference to FIGS. 3 to 6.

The memory controller 200 may control general operation of the sub-memory system 1000*a*.

The memory controller 200 may execute firmware (FW) when power is applied to the sub-memory system 1000*a*. The firmware (FW) may include a host interface layer (HIL) receiving a request input from the host device 2000 or outputting a response to the host device 2000, a translation layer (TL) managing an operation between an interface of the host device 2000 and an interface of the memory device 100, and a memory interface layer (MIL) providing a command to the memory device 100 or receiving a response from the memory device 100.

The memory controller 200 may control the memory device 100 to perform a write operation, a read operation or an erase operation in response to a request from the host device 2000. During the write operation, the memory controller 200 may provide a write command, a bank address, and data to the memory device 100. During the read operation, the memory controller 200 may provide a read command and a bank address to the memory device 100. During the erase operation, the memory controller 200 may provide an erase command and a bank address to the memory device 100.

According to an embodiment of the present disclosure, the memory controller 200 may include a read operation control component 210, a weight update component 220, and an operating component 230.

The read operation control component 210 may identify a physical address corresponding to a query from the query broadcasted from the host device 2000 and control the memory device 100 to read pieces of data corresponding to the physical address. In response to the query received from the host device 2000, the read operation control component 210 of the memory controller 200 may obtain pieces of data corresponding to the query among pieces of partial data from the memory device 100.

The weight update component 220 may control the memory device 100 to update a weight of pieces of partial data stored in the memory device 100 based on the data received from the host device 2000. More specifically, the weight update component 220 may control the memory device 100 to update the pieces of partial data corresponding to partition data obtained by partitioning embedding data. The weight update component 220 may be a configuration for controlling the memory device 100 to store the partition data in the memory device 100.

The operating component 230 may perform a pooling operation for generating embedding data or an unpooling operation for generating pieces of partition data.

More specifically, in response to the query received from the host device 2000, the operating component 230 may obtain pieces of data corresponding to the query from the memory device 100. In addition, the operating component 230 may perform a pooling operation for generating embedding data using data corresponding to a query. More specifically, the operating component 230 may generate the embedding data by the pooling operation for compressing the pieces of data corresponding to the query. The above-described pooling operation may be for performing an element-wise operation on pieces of vector information of the pieces of data each other. For example, elements of the pieces of vector information may be summed up by the pooling operation. The pooling operation may be a process for integrating a plurality of vectors into a single vector. The pooled memory system 10000 may reduce a size of data by a pooling operation and may reduce an amount of data transmission to the host device 2000. In addition, the operating component 230 may perform an unpooling operation for generating pieces of partition data in response to the query received from the host device 2000 and the embedding data. More specifically, the operating component 230 may perform the unpooling operation for partitioning the embedding data into a plurality of pieces of partition data.

Figure 3:
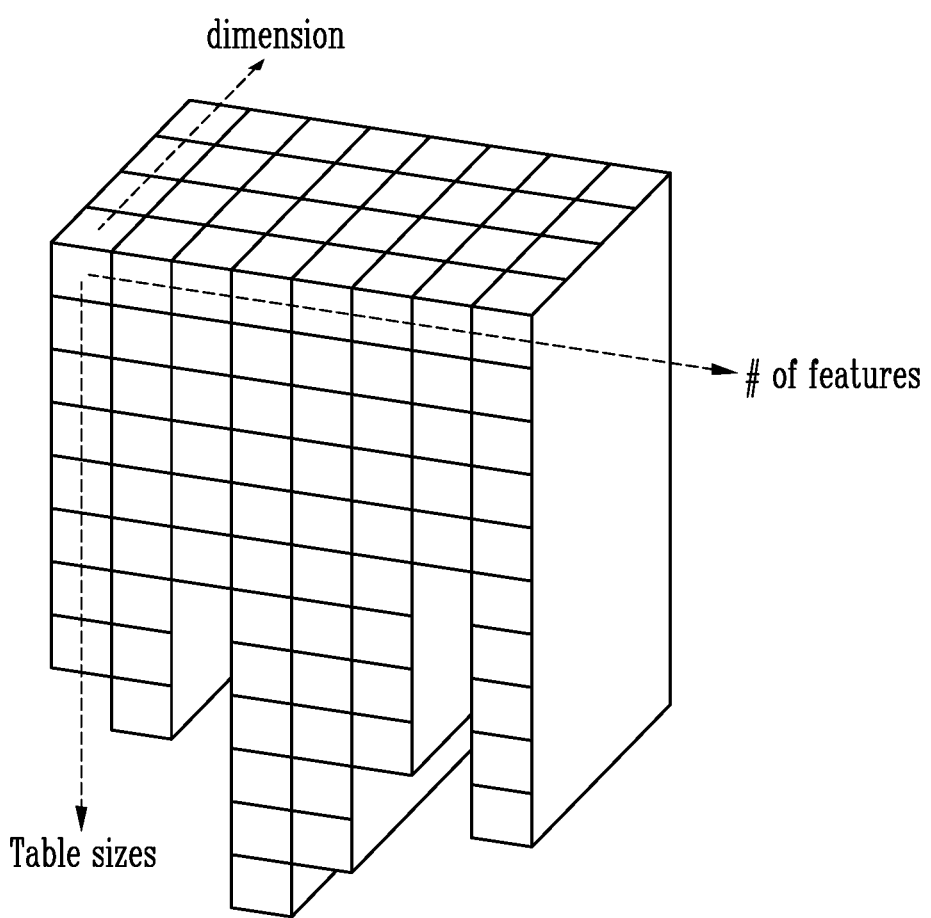
FIG. 3 is a diagram illustrating an embedding table according to an embodiment of the present disclosure.

FIG. 3 is a diagram illustrating an embedding table according to an embodiment of the present disclosure.

Referring to FIG. 3, the embedding table stored in the plurality of sub-memory systems 1000 is illustrated.

The embedding table may include pieces of vector information about items of a learning model that has already been acquired. The learning model may refer to an artificial intelligence (AI) model, and the AI model may have a feature of being built by training. More specifically, the embedding table may be a collection of categorical data that can be classified into categories and embedding vector pairs corresponding thereto, and each of the items of the learning model may be categorical data. The categorical data in a form of a natural language may be digitized in a form of a vector having mutual similarity using an embedding algorithm. For example, the vector may be a set of numbers that consists of several integers or floating point numbers, for example, '(3, 5)' or '(0.1, −0.5, 2, 1.2)'. In other words, the embedding table may refer to a set of pieces of categorical data of a learning model built to classify data into categories and pieces of vector information of categorical data. When vector values such as a slope of an embedding vector or a form of an embedding vector are more similar to each other, corresponding words are more similar to each other in terms of semantics.

According to an embodiment of the present disclosure, the embedding table may have a three-dimensional structure. More specifically, referring to FIG. 3, the embedding table may have the three-dimensional structure including 'table sizes', '# of features', and 'dimension'. 'Table sizes' may refer to the number of items included in a category. For example, when a category labelled as <a title of a film> includes 'Harry Potter' and 'Shrek', the number of items is two (2). '# of features' may refer to the number of categories. For example, when the embedding table includes <a title of a film> and <a genre of a film>, the number of categories is two (2). 'Dimension' may refer to a dimension of an embedding vector. In other words, 'dimension' may refer to the number of figures included in a vector. For example, because a set of '(0.1, −0.5, 2, 1.2)' includes four (4) figures, this set may be indicated as four (4) dimensions.

Figure 4:
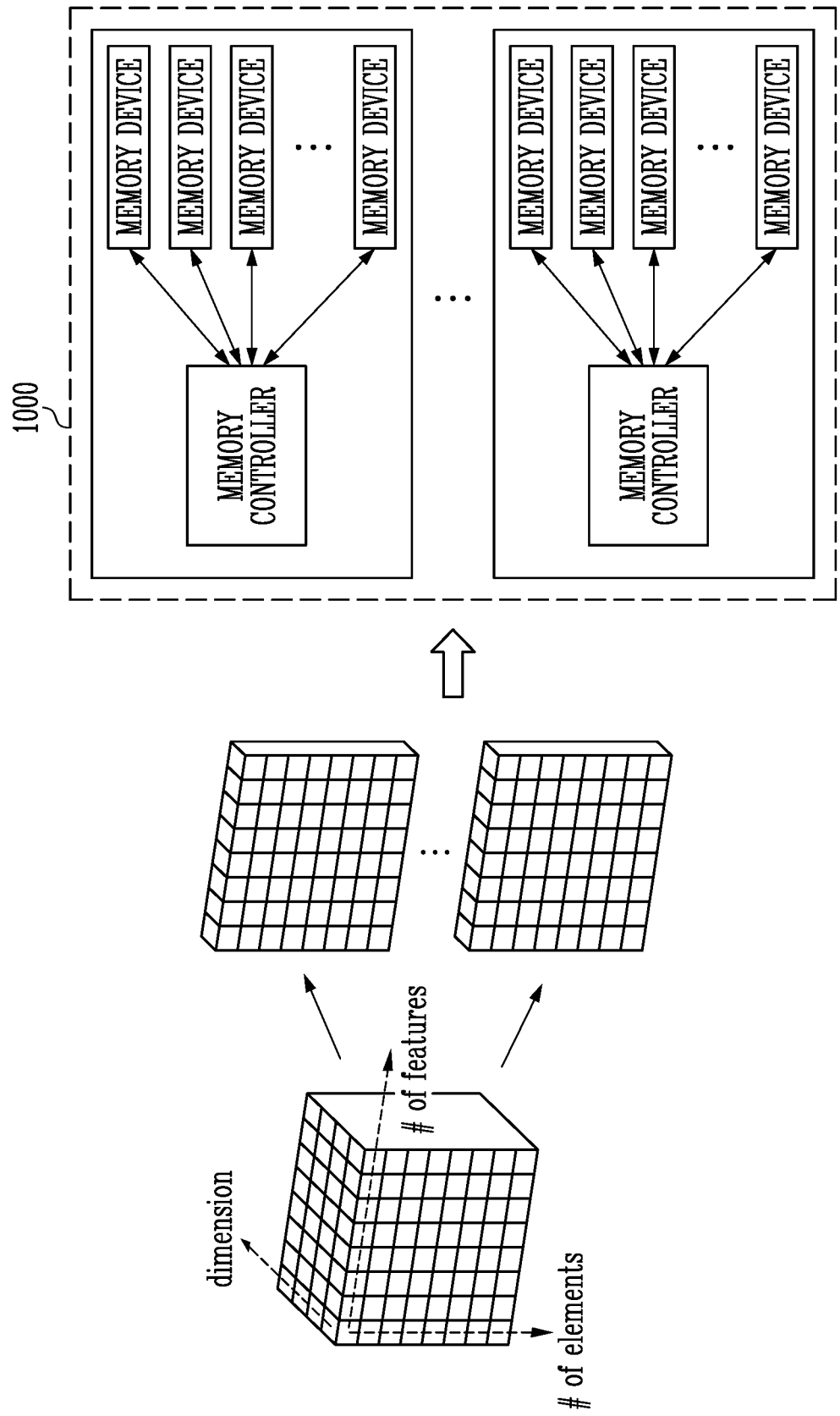
FIG. 4 is a diagram illustrating a method of storing pieces of partial data according to an embodiment of the present disclosure.

FIG. 4 is a diagram illustrating a method of storing pieces of partial data according to an embodiment of the present disclosure.

Referring to FIG. 4, embedding tables stored in a plurality of sub-memory systems, respectively, are illustrated.

Each of the embedding tables may include pieces of partial data. More specifically, each of the pieces of partial data may be obtained by partitioning the embedding table by units of dimensions of pieces of vector information. Each of the plurality of sub-memory systems may store partial data corresponding to at least one dimension. Operations related to embedding may be performed without deterioration in performance in the plurality of sub-memory systems 1000 by disposing the embedding tables as parallel as possible in the pooled memory system 10000.

Figure 5:
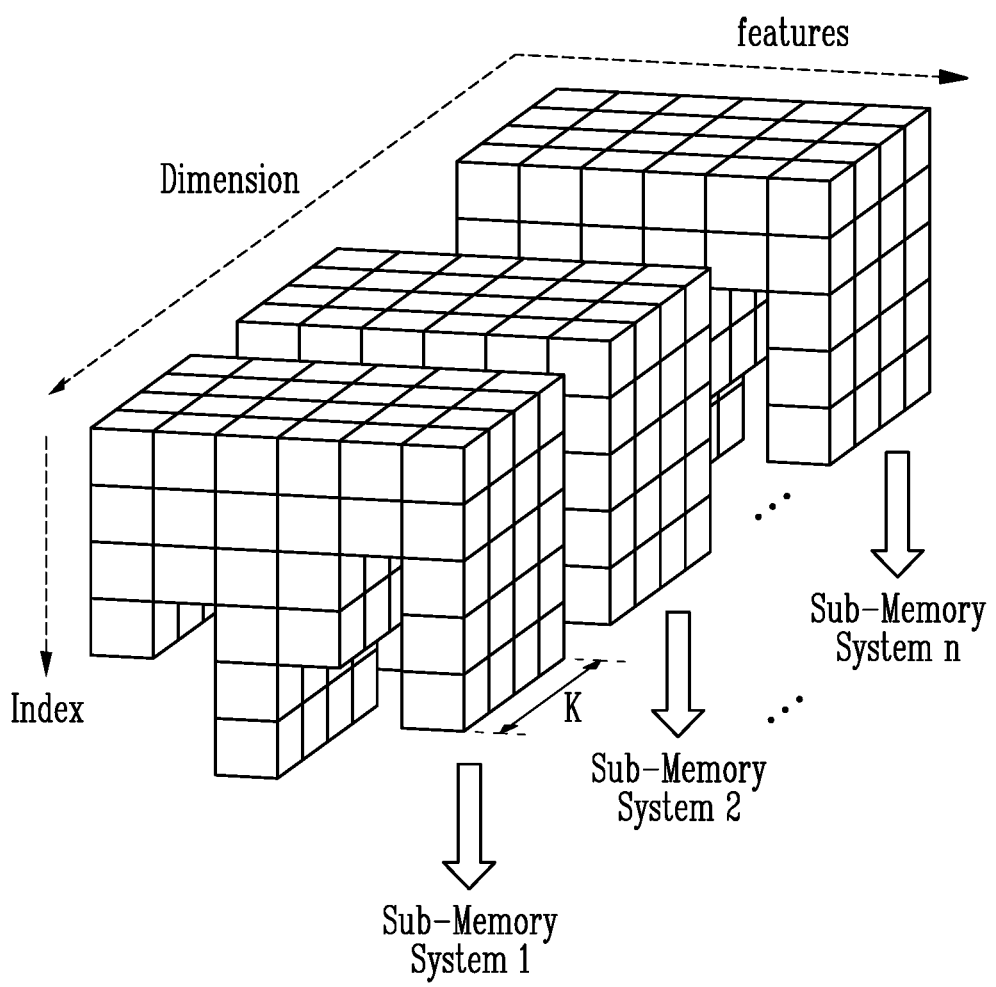
FIG. 5 is a diagram illustrating a method of storing pieces of partial data according to an embodiment of the present disclosure.

FIG. 5 is a diagram illustrating a method of storing pieces of partial data according to an embodiment of the present disclosure.

Referring to FIG. 5, pieces of partial data stored in each of the plurality of sub-memory systems 1000 are illustrated. Each of the plurality of sub-memory systems 1000 may store the pieces of partial data which are obtained by partitioning an embedding table by units of 'k' number of dimensions, as shown in FIG. 5. For example, a first sub-memory system may store pieces of partial data obtained by partitioning the embedding table by the 'k' number of dimensions from a 'n-th' dimension to a '(n+k−1)-th' dimension. A second sub-memory system may store pieces of partial data obtained by partitioning the embedding table by the dimension of the vector information by the 'k' number of dimensions from a '(n+k)-th' dimension to a '(n+2k-1)-th' dimension. By the above-described method, the pooled memory system 10000 may store the embedding table in the plurality of sub-memory systems 1000.

According to the embodiment illustrated in FIG. 5, the plurality of sub-memory systems 1000 each store the pieces of partial data that are obtained by the same number of dimensions. However, embodiments are not limited thereto. According to another embodiment, each of the plurality of sub-memory systems 1000 may be implemented to store pieces of partial data which are obtained by partitioning an embedding table by an arbitrary number of dimensions.

Figure 6:
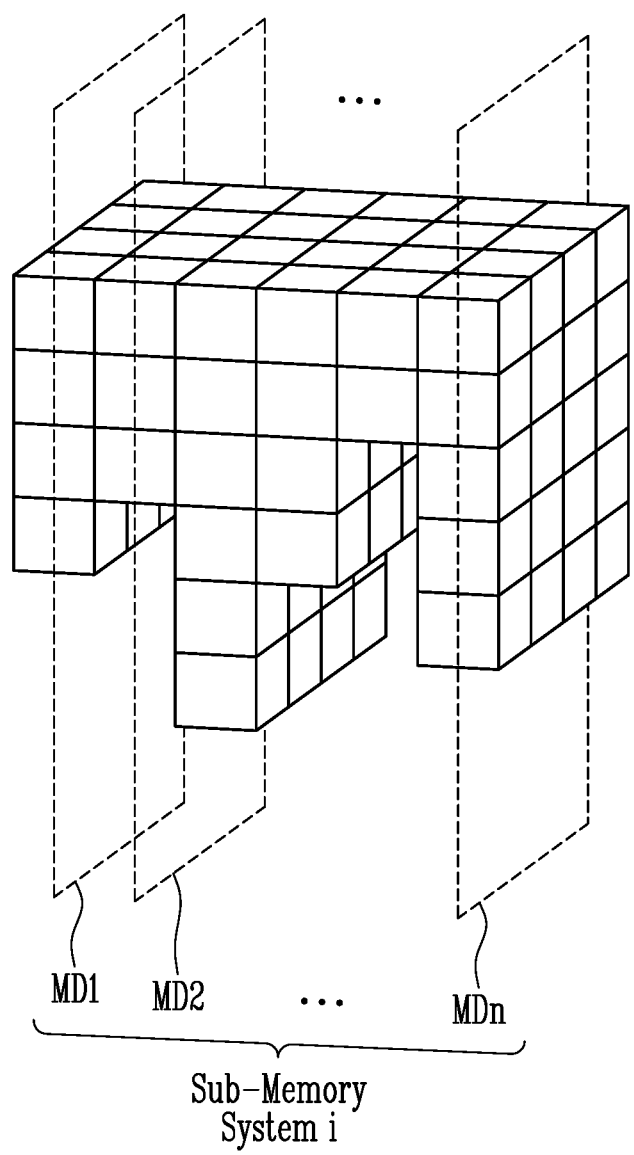
FIG. 6 is a diagram illustrating a method of storing pieces of partial data according to an embodiment of the present disclosure.

FIG. 6 is a diagram illustrating a method of storing pieces of partial data according to an embodiment of the present disclosure.

Referring to FIG. 6, pieces of partial data stored in each of a plurality of memory devices are illustrated.

As described above with reference to FIG. 5, each of sub-memory systems may store pieces of partial data obtained by partitioning an embedding table by units of dimensions. More specifically, each of the sub-memory systems may store the pieces of partial data which are obtained by partitioning an embedding table by units of 'k' number of dimensions.

In addition, the sub-memory system may store the pieces of partial data in a plurality of memory devices. The sub-memory systems may include the plurality of memory devices and each of the plurality of memory devices may store partial data corresponding to at least one dimension.

For example, an ith sub-memory system may include first to nth memory devices MD1 to MDn, and each of the first to nth memory devices MD1 to MDn may store partial data corresponding to at least one dimension.

Figure 7:
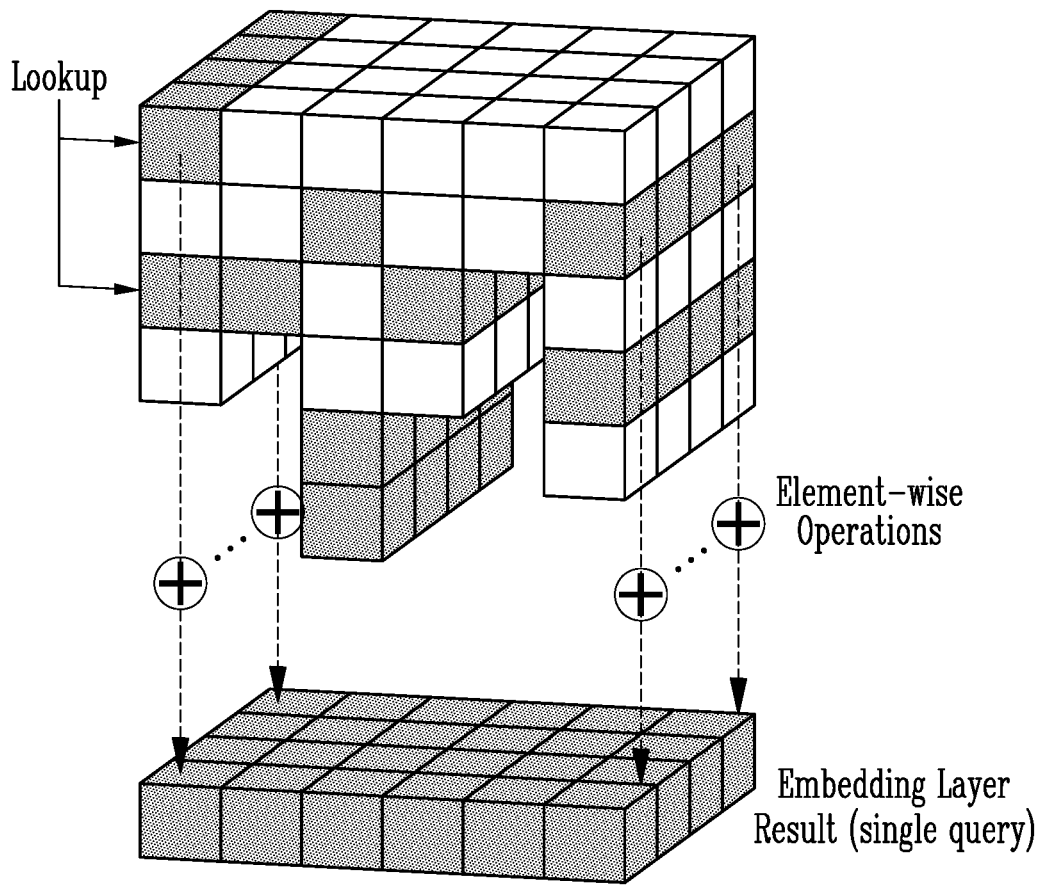
FIG. 7 is a diagram illustrating a lookup operation and a pooling operation according to an embodiment of the present disclosure.

FIG. 7 is a diagram illustrating a lookup operation and a pooling operation according to an embodiment of the present disclosure.

Referring to FIG. 7, the lookup operation for searching an embedding table for pieces of vector information and the pooling operation for compressing the pieces of vector information are illustrated.

When a query is received from the host device 2000, each of the plurality of sub-memory systems 1000 coupled to the host device 2000 may perform the lookup operation for obtaining data corresponding to the query.

More specifically, the lookup operations may be performed in parallel in each of the plurality of sub-memory systems 1000. Each of the sub-memory systems 1000 may include the plurality of memory devices 100 and each of the plurality of memory devices 100 may perform the lookup operation for obtaining data corresponding to the query from stored partial data. In other words, because the plurality of memory devices 100 perform the lookup operations in parallel, the plurality of sub-memory systems 1000 may simultaneously perform the lookup operations.

In addition, each of the plurality of sub-memory systems 1000 may perform the pooling operation for generating embedding data by using the pieces of data obtained by the lookup operation.

More specifically, the pooling operations may be performed in parallel in each of the plurality of sub-memory systems 1000. Each of the sub-memory systems 1000 may include the memory controller 200 and the memory controller 200 may perform the pooling operation for generating the embedding data by compressing the pieces of data obtained by the lookup operation. According to an embodiment of the present disclosure, the memory controller 200 may perform an element-wise operation on pieces of vector information of the pieces of data obtained from the plurality of memory devices 100.

More specifically, the memory controller 200 may perform the element-wise operation on the pieces of vector information to generate a single piece of vector information. The pooled memory system 10000 may perform the pooling operation in each of the plurality of sub-memory systems 1000 and reduce an amount of data transmission to the host device 2000 from the plurality of sub-memory systems 1000.

Figure 8:
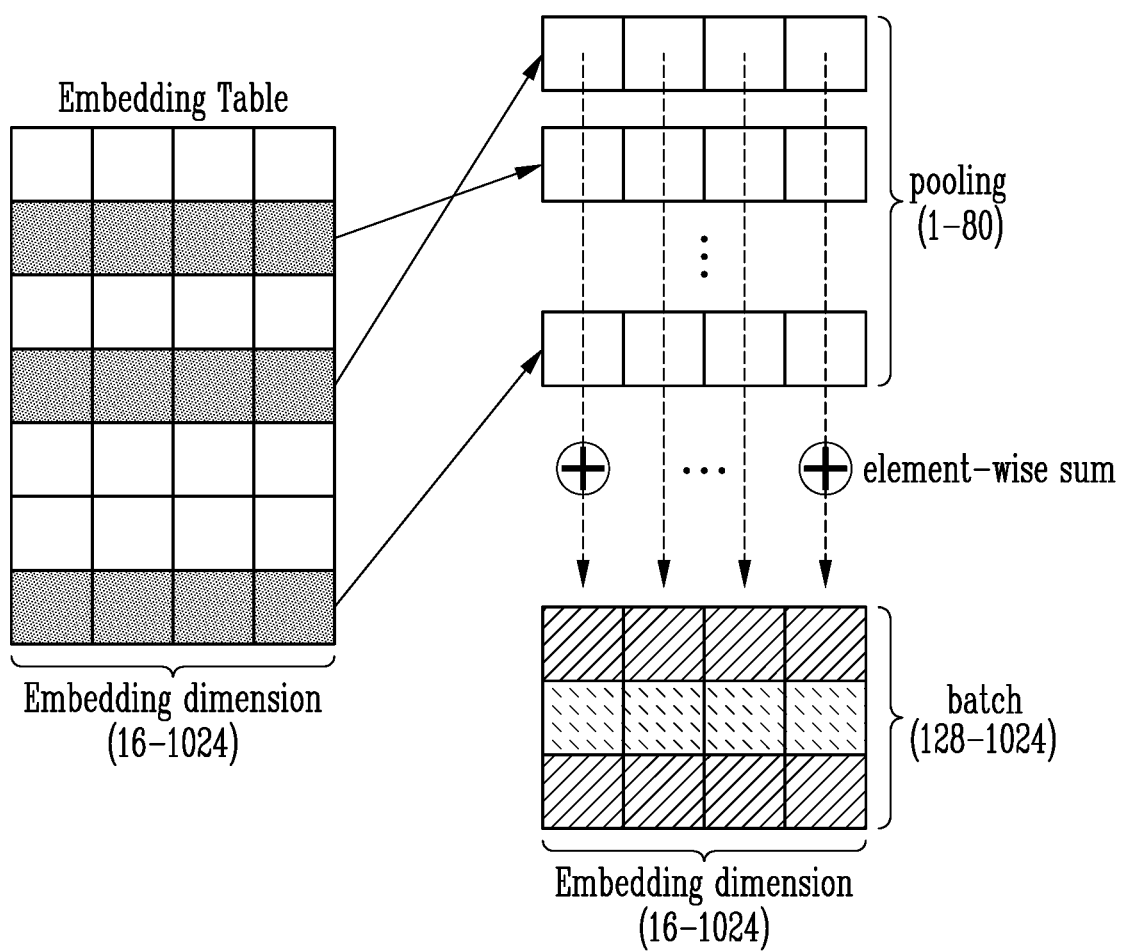
FIG. 8 is a diagram illustrating an inference operation according to an embodiment of the present disclosure.

FIG. 8 is a diagram illustrating an inference operation according to an embodiment of the present disclosure.

Referring to FIG. 8, the inference operation is illustrated. In the inference operation, each of the plurality of sub-memory systems 1000 performs a pooling operation for compressing pieces of vector information obtained from an embedding table and provides pieces of embedding data generated by the pooling operation to the host device 2000.

More specifically, each of the sub-memory systems may store pieces of partial data obtained by partitioning the embedding table in the plurality of memory devices 100. The embedding table may be a table including pieces of vector information about items of a learning model that have already been acquired. The plurality of memory devices 100 may store pieces of partial data obtained by partitioning the embedding table by units of dimensions of the pieces of vector information. For example, each of the pieces of partial data may be the pieces of partial data obtained by partitioning the embedding table by units of 16 to 1024 dimensions. The memory controller 200 included in each of the sub-memory systems may obtain pieces of data corresponding to a query received from the host device 2000 among the pieces of partial data from each of the plurality of memory devices 100.

The memory controller 200 included in each of the sub-memory systems may perform the pooling operation for generating the embedding data by using the pieces of obtained data. For example, the memory controller 200 may obtain 1 to 80 pieces of data from the plurality of memory devices 100 and generate the embedding data by performing an element-wise operation on the pieces of vector information of the pieces of obtained data. The above-described pooling operation may be for performing an element-wise operation on pieces of vector information of pieces of data each other. For example, elements of the pieces of vector information may be summed up by the pooling operation. The pooling operation may be a process for integrating a plurality of read vectors into a single vector.

The memory controller 200 included in each of the sub-memory systems may provide the generated embedding data to the host device 2000. More specifically, the memory controller 200 may generate a batch by accumulating the pieces of embedding data. In addition, the memory controller 200 may provide the generated batch to the host device 2000. The batch may be a bunch of pieces of embedding data or collection data and one batch may include 128 to 1024 pieces of embedding data.

Figure 9:
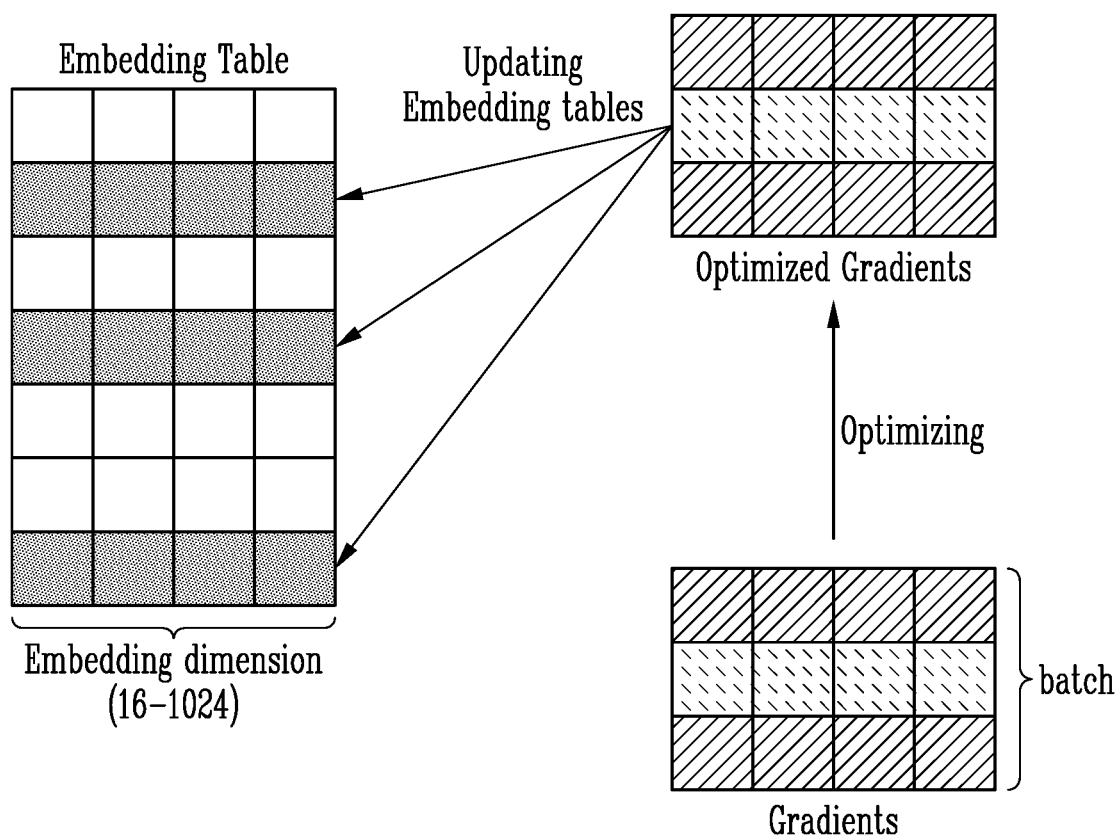
FIG. 9 is a diagram illustrating a training operation according to an embodiment of the present disclosure.

FIG. 9 is a diagram illustrating a training operation according to an embodiment of the present disclosure.

Referring to FIG. 9, the training operation is illustrated. In the training operation, each of the plurality of sub-memory systems 1000 performs an unpooling operation for partitioning a gradient received from the host device 2000 and updates an embedding table using the partitioned gradient. The gradient is data used for updating the embedding table and may refer to embedding data including a weight.

Each of the sub-memory systems may store pieces of partial data obtained by partitioning the embedding table in the plurality of memory devices 100. The embedding table may include pieces of vector information about items of a learning model that has already been acquired. The plurality of memory devices 100 may store the pieces of partial data obtained by partitioning the embedding table by units of dimensions of the pieces of vector information. For example, each of the pieces of partial data may be the pieces of partial data obtained by partitioning the embedding table by units of 16 to 1024 dimensions.

The memory controller 200 included in each of the sub-memory systems may receive a broadcasted query requesting an update on the embedding table and broadcasted gradient, i.e., embedding data including a weight from the host device 2000. The broadcasted gradient may be received from the host device 2000 in units of batches by each of the sub-memory systems. In addition, the memory controller 200 may perform an unpooling operation for generating pieces of partition data using the gradient received from the host device 2000. For example, the memory controller 200 may receive the broadcasted batches of the gradient, i.e., embedding data including a weight from the host device 2000. In addition, the memory controller 200 may generate the pieces of partition data using the batches of the gradient broadcasted from the host device 2000. The memory controller 200 may perform the unpooling operation for partitioning the embedding data into the pieces of partition data to easily update the embedding table. The above-described unpooling operation may be for performing an element-wise operation on pieces of vector information of pieces of data with each other.

In addition, the memory controller 200 included in each of the sub-memory systems may control the plurality of memory devices 100 to update partial data corresponding to the pieces of partition data in each of the plurality of memory devices 100.

The pooled memory system 10000 may broadcast a query requesting an update and the gradient, i.e., embedding data including a weight to the plurality of sub-memory systems 1000 and may control each of the sub-memory systems to update the partial data. The pooled memory system 10000 may train a learning model stored in each of the sub-memory systems using the query and the embedding data.

Figure 10:
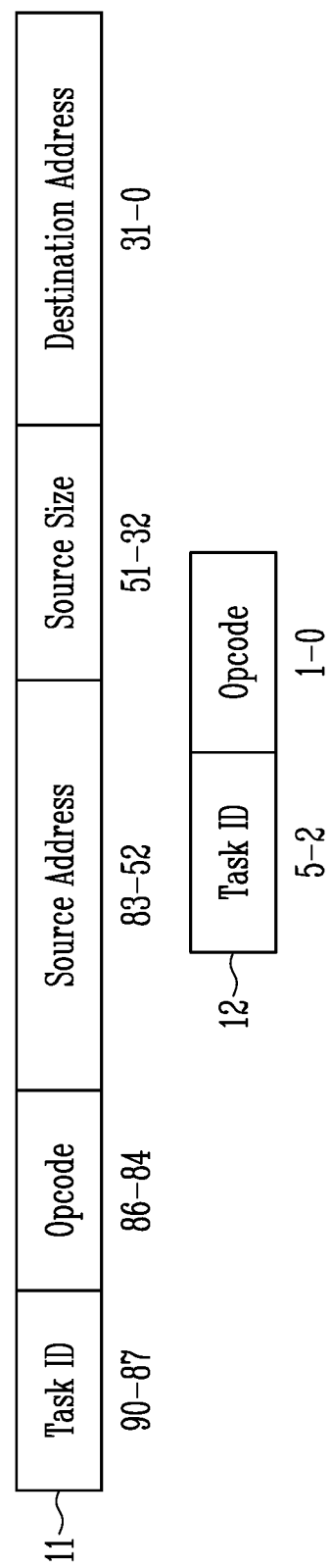
FIG. 10 is a diagram illustrating communication packets of a host device and a sub-memory system according to an embodiment of the present disclosure.

FIG. 10 is a diagram illustrating communication packets of the host device 2000 and the sub-memory system 1000 according to an embodiment of the present disclosure.

Referring to FIG. 10, the communication packets between the host device 2000 and the plurality of sub-memory systems 1000 are illustrated. More specifically, a first communication packet 11 may be a message transmitted from the host device 2000 to the plurality of sub-memory systems 1000. The first communication packet 11 may include 'Task ID', 'Opcode', 'Source Address', 'Source Size' and 'Destination Address'.

The first communication packet 11 may consist of 91 bits in total and 4 bits may be allotted to 'Task ID'. 'Task ID' may indicate an operating state of the host device 2000. For example, 'Task ID' may indicate whether an operation of the host device 2000 is running or terminated. The host device 2000 may realign an operation of the sub-memory system using 'Task ID'.

3 bits may be allotted to 'Opcode' and 'Opcode' may include data for distinguishing a plurality of embedding operations from each other. More specifically, the host device 2000 may use 'Opcode' to distinguish between initialization of the embedding table, an inference operation, and a training operation.

32 bits may be allotted to 'Source Address', and the 'Source Address' may include data about a source address of a query or a gradient. More specifically, the host device 2000 may include, into the 'Source Address', data about an address of the gradient which each of the sub-memory systems fetches from a host memory. The gradient is data used for updating the embedding table and may refer to embedding data including a weight.

20 bits may be allotted to 'Source Size' and 'Source size' may include data about a size of a query or a gradient which each of the sub-memory systems fetches from the host memory. 'Destination Address' may include an address of the host memory, at which a result of an internal operation of each of the sub-memory systems will be stored.

The host device 2000 may communicate with the plurality of sub-memory systems 1000 using the first communication packet 11. In addition, when the plurality of sub-memory systems 1000 receive the first communication packet 11 from the host device 2000, the plurality of sub-memory systems 1000 may transmit a second communication packet 12 which is a response message. The second communication packet 12 may include 'Task ID' and 'Opcode'.

Figure 11:
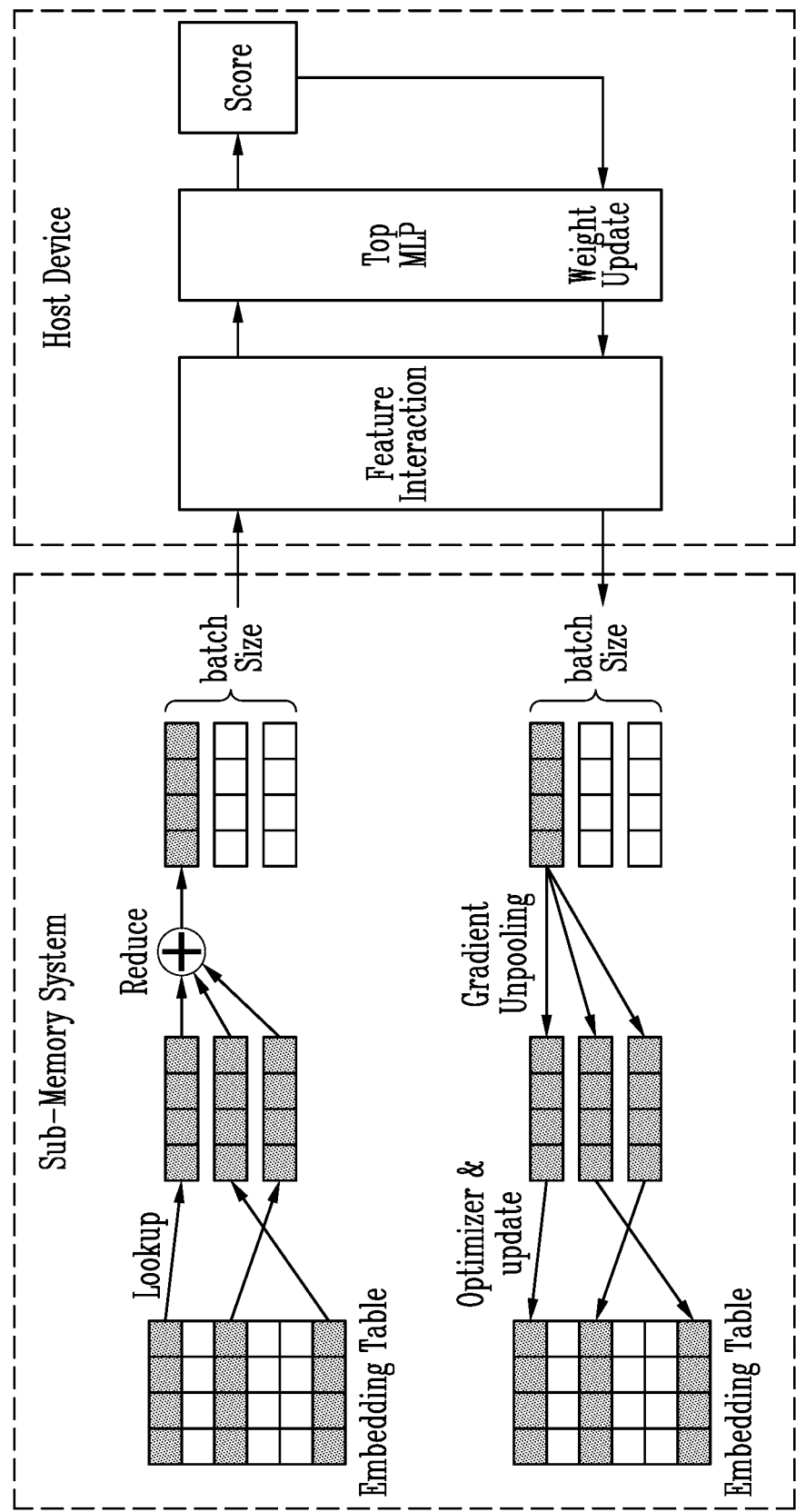
FIG. 11 is a diagram illustrating an inference operation and a training operation according to an embodiment of the present disclosure.

FIG. 11 is a diagram illustrating an inference operation and a training operation according to an embodiment of the present disclosure.

Referring to FIG. 11, the pooled memory system 10000 which includes the plurality of sub-memory systems 1000 and the host device 2000, and performs the inference operation and the training operation is illustrated.

The sub-memory system 1000 may store pieces of partial data obtained by partitioning an embedding table including pieces of vector information about items of a learning model that has already been acquired in the memory device 100.

The host device 2000 may control the sub memory system 1000 to perform a pooling operation for generating pieces of embedding data. The above-described pooling operation may be for performing an element-wise operation on pieces of vector information of pieces of data with each other to generate a single piece of vector information. The sub-memory system 1000 may provide the pieces of generated embedding data to the host device 2000.

The host device 2000 may generate training data using the pieces of embedding data received from the sub-memory system 1000. More specifically, the host device 2000 may compare features of the pieces of embedding data with each other. The pieces of embedding data may include embedding vectors, and the host device 2000 may compare vector values such as slopes, forms, or sizes of the embedding vectors with each other. When the vector values such as the slopes of the embedding vectors or the forms of the embedding vectors are more similar to each other, corresponding words are more similar to each other in terms of semantics. The host device 2000 may calculate scores of the pieces of embedding data received from the sub-memory system 1000 and generate the training data based on the calculated scores. The training data may be used for updating the embedding table and may refer to embedding data in which a weight is corrected.

The host device 2000 may control the sub-memory system 1000 to learn the training data. The sub-memory system 1000 may perform an unpooling operation for partitioning the training data received from the host device 2000 and update a weight of the embedding table.

Figure 12:
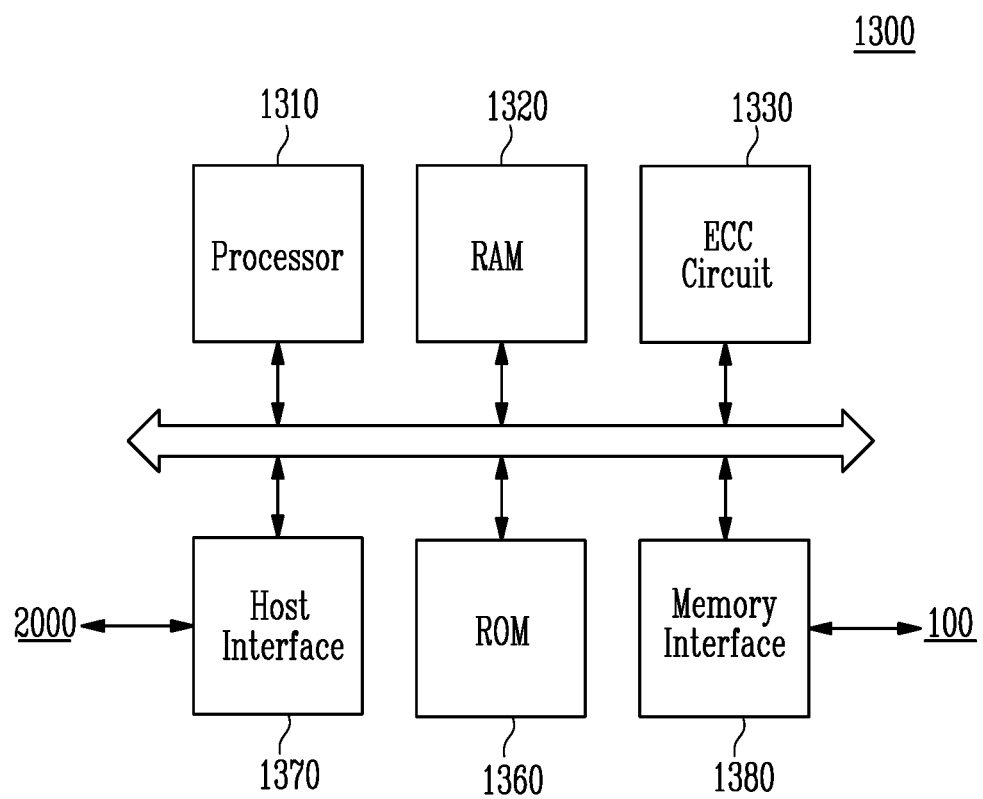
FIG. 12 is a block diagram illustrating a configuration of a memory controller according to another embodiment of the present disclosure.

FIG. 12 is a block diagram illustrating a configuration of a memory controller 1300 according to another embodiment of the present disclosure.

Referring to FIG. 12, the memory controller 1300 may include a processor 1310, RAM 1320, an Error Correction Code (ECC) circuit 1330, ROM 1360, a host interface 1370, and a memory interface 1380. The memory controller 1300 illustrated in FIG. 12 may be an embodiment of the memory controller 200 shown in FIGS. 1 and 2.

The processor 1310 may communicate with the host device 2000 using the host interface 1370 and perform a logical operation to control an operation of the memory controller 1300. For example, the processor 1310 may load a write command, a data file, or a data structure in response to a request received from the host device 2000 or an external device, perform various operations, or generate a command and an address. For example, the processor 1310 may generate various commands used for performing a write operation, a read operation, an erase operation, a suspend operation, and a parameter setting operation.

The processor 1310 may perform a function of a translation layer (TL). The processor 1310 may identify a physical address provided by the host device 2000.

The processor 1310 may generate a command without requests from the host device 2000. For example, the processor 1310 may generate a command for background operations such as operations for a refresh operation of the memory device 100.

The RAM 1320 may serve as buffer memory, operation memory, or cache memory of the processor 1310. The RAM 1320 may store codes and commands executed by the processor 1310. The RAM 1320 may store data processed by the processor 1310. When the RAM 1320 is implemented, the RAM 1320 may include Static RAM (SRAM) or Dynamic RAM (DRAM).

The ECC circuit 1330 may detect and correct errors during a write operation or a read operation. More specifically, the ECC circuit 1330 may perform an error correction operation according to an Error Correction Code (ECC). The ECC circuit 1330 may perform ECC encoding based on data to be written to the memory device 100. The data to which the ECC encoding has been performed may be transmitted to the memory device 100 through the memory interface 1380. In addition, the ECC circuit 1330 may perform ECC decoding on data received from the memory device 100 through the memory interface 1380.

The ROM 1360 may serve as a storage unit storing various types of information used for operations of the memory controller 1300. The ROM 1360 may be controlled by the processor 1310.

The host interface 1370 may include a protocol for exchanging data between the host device 2000 and the memory controller 1300. More specifically, the host interface 1370 may communicate with the host device 2000 through one or more various interface protocols such as a Universal Serial Bus (USB) protocol, a multimedia card (MMC) protocol, a peripheral component interconnection (PCI) protocol, a PCI-Express (PCI-E) protocol, an Advanced Technology Attachment (ATA) protocol, a serial-ATA protocol, a parallel-ATA protocol, a Small Computer System Interface (SCSI) protocol, an Enhanced Small Disk Interface (ESDI) protocol, an Integrated Drive Electronics (IDE) protocol, and a private protocol.

The memory interface 1380 may communicate with the memory device 100 using a communication protocol according to control of the processor 1310. More specifically, the memory interface 1380 may communicate commands, addresses, and data with the memory device 100 through channels.

According to embodiments of the present disclosure, a plurality of improved sub-memory systems performing Near Data Processing (NDP) and a pooled memory system including the same may be provided.

What is claimed is:

1. A memory system, comprising:
    a plurality of memory devices configured to store pieces of partial data obtained by partitioning an embedding table including pieces of vector information about items of a learning model that have already been acquired; and
    a memory controller configured to obtain, in response to a query received from a host, pieces of data corresponding to the query among the pieces of partial data from each of the plurality of memory devices, perform a pooling operation for generating embedding data using the pieces of data that have been obtained, and provide the embedding data to the host,
    wherein the query includes a request for the pooling operation, an address of host memory to receive the embedding data, and a physical address corresponding to any one among the plurality of memory devices,
    wherein the pieces of vector information indicate embedding vectors corresponding to categorical data,
    wherein each of the pieces of partial data is data obtained by partitioning the embedding table by units of a preset number of dimensions of the embedding vectors, and
    wherein each of the dimensions corresponds to each of figures included in each of the embedding vectors.

2. The memory system of claim 1, wherein the memory controller comprises:
    a read operation control component configured to identify the physical address corresponding to the query and control each of the plurality of memory devices to read pieces of data corresponding to the physical address; and
    an operating component configured to perform the pooling operation for generating the embedding data by compressing the pieces of data that have been obtained.

3. The memory system of claim 2, wherein the operating component performs an element-wise sum operation on vector information of the pieces of data that have been obtained to generate the embedding data.

4. The memory system of claim 1, wherein the embedding data is an embedding vector including vector information of the pieces of data that have been obtained.

5. The memory system of claim 1, wherein the embedding table classifies the items according to a category and includes the pieces of vector information that are digitized based on a similarity between the items that have been classified.

6. The memory system of claim 1,
    wherein each of the plurality of memory devices stores the partial data corresponding to at least one dimension that is partitioned from the embedding table.

7. A memory system, comprising:
    a plurality of memory devices configured to store pieces of partial data obtained by partitioning an embedding table including pieces of vector information about items of a learning model that have already been acquired; and
    a memory controller configured to perform, in response to a query and embedding data received from a host, an unpooling operation for generating pieces of partition data using the embedding data and control the plurality of memory devices to update the partial data corresponding to the pieces of partition data stored in each of the plurality of memory devices, wherein the pieces of vector information indicate embedding vectors corresponding to categorical data, wherein each of the pieces of partial data is data obtained by partitioning the embedding table by units of a preset number of dimensions of the embedding vectors, and wherein each of the dimensions corresponds to each of figures included in each of the embedding vectors.

8. The memory system of claim 7, wherein the memory controller comprises:

an operating component configured to perform the unpooling operation for partitioning the embedding data into the pieces of partition data; and a weight update component configured to control the plurality of memory devices to update a weight of the partial data corresponding to the pieces of partition data stored in each of the plurality of memory devices.

9. The memory system of claim 8, wherein the operating component performs an element-wise sum operation on vector information of the embedding data.

10. The memory system of claim 7, wherein the query includes a request for the unpooling operation, an address of host memory corresponding to the embedding data, and a physical address corresponding to any one among the plurality of memory devices.

11. The memory system of claim 7, wherein the embedding table classifies the items according to a category and includes the pieces of vector information that are digitized based on similarity between the items that have been classified.

12. The memory system of claim 7, wherein each of the plurality of memory devices stores the partial data corresponding to at least one dimension that is partitioned from the embedding table.

13. A pooled memory system, comprising:

a host device; and a plurality of sub-memory systems configured to store pieces of partial data obtained by partitioning an embedding table including pieces of vector information about items of a learning model that have already been acquired, wherein the host device is configured to:

broadcast a first query to the plurality of sub-memory systems; and control each of the plurality of sub-memory systems to obtain pieces of data corresponding to the first query among the pieces of partial data by using the first query, perform a pooling operation for generating embedding data using the pieces of data that have been obtained, and provide the embedding data to the host device, wherein the pieces of vector information indicate embedding vectors corresponding to categorical data, wherein each of the pieces of partial data is data obtained by partitioning the embedding table by units of a preset number of dimensions of the embedding vectors, and wherein each of the dimensions corresponds to each of figures included in each of the embedding vectors.

14. The pooled memory system of claim 13, wherein each of the plurality of sub-memory systems comprises:

a plurality of memory devices configured to store the pieces of partial data obtained by partitioning the embedding table including the pieces of vector information about the items of the learning model that have already been acquired;

a read operation control component configured to identify a physical address corresponding to the first query and control each of the plurality of memory devices to read pieces of data corresponding to the physical address; and an operating component configured to perform the pooling operation for generating the embedding data by compressing the pieces of data that have been obtained.

15. The pooled memory system of claim 14, wherein the operating component performs an element-wise operation on vector information of the pieces of data that have been obtained.

16. The pooled memory system of claim 14, wherein the host device controls the plurality of sub-memory systems by using the first query including a request for the pooling operation, an address of a host memory device to receive the embedding data, and a physical address of the plurality of memory devices.

17. The pooled memory system of claim 13, wherein the embedding table classifies the items according to a category and includes the pieces of vector information that are digitized based on a similarity between the items that have been classified.

18. The pooled memory system of claim 13, wherein each of the plurality of sub-memory systems stores the partial data corresponding to at least one dimension that is partitioned from the embedding table.

19. The pooled memory system of claim 13, wherein the host device generates training data for updating the embedding table based on the embedding data received from each of the plurality of sub-memory systems.

20. The pooled memory system of claim 19, wherein the host device broadcasts a second query and the training data to the plurality of sub-memory systems, and wherein each of the plurality of sub-memory systems performs an unpooling operation for generating pieces of partition data using the training data in response to the second query and the training data received from the host device and updates the partial data corresponding to the pieces of partition data stored in each of the plurality of sub-memory systems.

21. The pooled memory system of claim 20, wherein each of the plurality of sub-memory systems comprises:

an operating component configured to perform the unpooling operation for partitioning the training data into the pieces of partition data; and a weight update component configured to update a weight of pieces of the partial data corresponding to the pieces of partition data.

22. The pooled memory system of claim 20, wherein the host device controls the plurality of sub-memory systems by using the second query including a request for the unpooling operation, an address of a host memory device corresponding to the training data, and a physical address corresponding to any one among the plurality of sub-memory systems.

23. A pooled memory system, comprising:

a plurality of sub-memory systems, each of the plurality of sub-memory systems including:

a memory device configured to store pieces of partial data obtained by partitioning an embedding table including pieces of vector information about items of a learning model that have already been acquired; and a memory controller configured to perform a pooling operation for generating pieces of embedding data and an unpooling operation for partitioning training data; and a host device configured to generate the training data using the pieces of embedding data received from the plurality of sub-memory systems and control the plurality of sub-memory systems to learn the training data, wherein the pieces of vector information indicate embedding vectors corresponding to categorical data, wherein each of the pieces of partial data is data obtained by partitioning the embedding table by units of a preset number of dimensions of the embedding vectors, and wherein each of the dimensions corresponds to each of figures included in each of the embedding vectors.

* * * * *